United States Patent Office — 3,162,629 — Patented Dec. 22, 1964

3,162,629
3-ETHYLENE MERCAPTOLE DERIVATIVES
OF 6-METHYL PROGESTERONE
Irving Scheer, Somerville, N.J., assignor to Ortho Pharmaceutical Corporation, a corporation of New Jersey
No Drawing. Filed June 6, 1962, Ser. No. 200,347
12 Claims. (Cl. 260—239.5)

The present invention relates to a new group of thioketals of 6α-methyl-progesterone-17α-ol, and to esters of these thioketals.

The compounds of this invention are valuable pharmaceutical agents. The esters of 6α-methyl-progesterone-17α-ol-3-thioketal possess anti-ovulatory properties and are effective in regulating ovulation. The acetate for example has practically no estrogenic properties and does not stimulate the endometrium yet prevents ovulation at lower levels than 17α-ethynylestra-4-en-17β-ol-3-one or 17α-ethynyl-5(10)-estren-17β-ol-3-one. Moreover the compounds of the present invention administered orally prevent ovulation at dosage levels well below those at which androgenic effects become prominent. The esters of the present invention can be administered in conventional dosage forms such as pills, tablets, capsules, syrups or elixirs for oral use. The products of the present invention may also be compounded in a form suitable for injection.

It is an object of the present invention to make available an oral contraceptive that will have minimal side effects.

The starting materials for the compounds of the present invention are 6α-methyl-17α-hydroxyprogesterone and its esters which may be converted directly to the desired 3-thioketal.

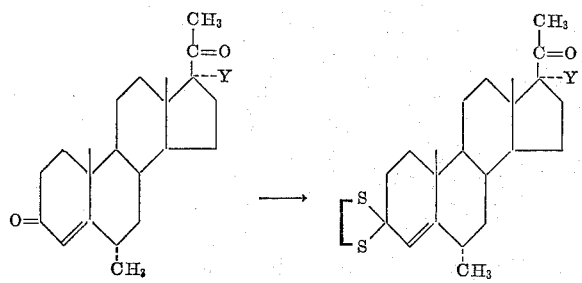

In the above structural formulae Y is a radical selected from the groups consisting of hydroxy and acyloxy radicals.

The following examples illustrate procedures suitable for production of the compounds of the present invention, but are not intended to limit the scope of this invention.

EXAMPLE I

6α-Methyl-4-Pregnen-17α-Ol-20-One-3-Thioketal

A mixture of one gram 6α-methyl-4-pregnen-17α-ol-3,20-dione, 1 ml. of ethane dithiol, 2 ml. of methylene chloride and 1 gram of pyridine hydrochloride is stirred gently at room temperature for three minutes. The reaction is quenched by adding 30 ml. of methanol and cooling the flask in an ice bath for 2 minutes. The resulting precipitate is filtered, washed with ice-cold methanol and dried under vacuum at room temperature. The 6α-methyl-4-pregnen-17α-ol-20-one-3-thioketal so obtained may be recrystallized from methanol-methylene dichloride to give 0.9 gram of a product melting at 186–188° C. The optical rotation in chloroform $\alpha_D^{20}$ is +99°.

EXAMPLE II

6α-Methyl Progesterone-17α-Ol Acetate

To a stirred suspension of 6.0 grams of 6α-methyl-17α-hydroxy-progesterone in 50 grams of glacial acetic acid is added 12 ml. of trifluoroacetic anhydride. A mildly exothermic reaction occurs and the solid gradually dissolves. The solution is heated on the steam bath for fifteen minutes and then it is poured with stirring into 600 grams of ice-and-water. To this is added 250 ml. of methylene chloride and the mixture is stirred while saturated aqueous potassium bicarbonate is added until a strongly alkaline pH is attained. The methylene chloride layer is separated and is washed three times with cold 200 ml. portions of 10% potassium bicarbonate. After drying with magnesium sulfate, the methylene chloride solution is concentrated under vacuum.

The oily residue of the crude 17α-ester is chromatographed on neutral alumina to isolate the pure 6α-methyl progesterone-17α-ol acetate, free of 17α-hydroxy compound, as shown by infrared spectrum. The yield of the desired ester is 78% of theory.

EXAMPLE III

6α-Methyl Progesterone-17α-Ol-Propionate

To a stirred suspension of 6.0 grams of 6α-methyl-17α-hydroxy-progesterone in 50 grams of propionic acid is added 12 ml. of trifluoroacetic anhydride. A mildly exothermic reaction occurs and the solid gradually dissolves. The solution is heated on the steam bath for fifteen minutes and then it is poured with stirring into 600 grams of ice-and-water. To this is added 250 ml. of methylene chloride and the mixture is stirred while saturated aqueous potassium bicarbonate is added until a strongly alkaline pH is attained. The methylene chloride layer is separated and is washed three times with cold 200 ml. portions of 10% potassium bicarbonate. After drying with magnesium sulfate, the methylene chloride solution is concentrated under vacuum.

The oily residue of the crude 17α-ester is chromatographed on neutral alumina to isolate the pure 6α-methyl progesterone-17α-ol propionate, free of 17α-hydroxy compound, as shown by infrared spectrum. The yield of the desired ester is 65% of theory.

EXAMPLE IV

6α-Methyl Progesterone-17α-Ol n-Valerate

To a stirred suspension of 6.0 grams of 6α-methyl-17α-hydroxy-progesterone in 50 grams of n-valeric acid is added 12 ml. of trifluoroacetic anhydride. A mildly exothermic reaction occurs and the solid gradually dissolves. The solution is heated on the steam bath for fifteen minutes and then it is poured with stirring into 600 grams of ice-and-water. To this is added 250 ml. of methylene chloride and the mixture is stirred while saturated aqueous potassium bicarbonate is added until a strongly alkaline pH is attained. The methylene chloride layer is separated and is washed three times with cold 200 ml. portions of 10% potassium bicarbonate. After drying with magnesium sulfate, the methylene chloride solution is concentrated under vacuum.

The oily residue of the crude 17α-ester is chromatographed on neutral alumina to isolate the pure 6α-methyl progesterone-17α-ol n-valerate, free of 17α-hydroxy compound, as shown by infrared spectrum. The yield of the desired ester is 71% of theory.

EXAMPLE V

6α-Methyl Progesterone-17α-Ol Cyclopentylpropionate

To a stirred suspension of 6.0 grams of 6α-methyl-17α-hydroxy-progesterone in 50 grams of cyclopentylpropionic acid is added 12 ml. of trifluoroacetic anhydride. A mildly exothermic reaction occurs and the solid gradually dissolves. The solution is heated on the steam bath for fifteen minutes and then it is poured with stirring into 600 grams of ice-and-water. To this is added 250 ml. of methylene chloride and the mixture is stirred while saturated aqueous potassium bicarbonate is added until a strongly alkaline pH is attained. The methylene chloride layer is separated and is washed three times with cold 200 ml. portions of 10% potassium bicarbonate. After drying with magnesium sulfate, the methylene chloride solution is concentrated under vacuum.

The oily residue of the crude 17α-ester is chromatographed on neutral alumina to isolate the pure 6α-methyl progesterone 17α-ol cyclopentylpropionate, free of 17α-hydroxy compound, as shown by infrared spectrum. The yield of the desired ester is 60% of theory.

EXAMPLE VI

6α-Methyl Progesterone-17α-Ol n-Butyrate

By the procedure described in Example II above, a 75% yield of the desired butyric acid ester is obtained from 50 grams of n-butyric acid.

EXAMPLE VII

6α-Methyl Progesterone-17α-Ol n-Hexanoate

By the procedure described in Example II above, a 67% yield of the desired hexanoic acid ester is obtained from 50 grams of n-hexanoic acid.

EXAMPLE VIII

6α-Methyl Progesterone-17α-Ol n-Octanoate

By the procedure described in Example II above, a 63% yield of the desired octanoic acid ester is obtained from 50 grams of n-octanoic acid.

EXAMPLE IX

6α-Methyl Progesterone-17α-Ol n-Heptanoate

By the procedure described in Example II above, a 67% yield of the desired heptanoic acid ester is obtained from 50 grams of n-heptanoic acid.

EXAMPLE X

6α-Methyl-17α-Acetoxy Progesterone-3-Ethylene Thioketal

To a solution of 5 grams of 6α-methyl-17α-acetoxyprogesterone in the minimum amount (5–15 ml.) of methylene chloride is added 5 ml. of ethanedithiol. This solution is stirred and chilled to 5°, and then 2 ml. of 1.5 N ethereal hydrogen chloride is added in one portion. After five minutes at 5–10°, the reaction mixture is held at 15–20° for ten minutes and then 20–70 ml. of methanol is added to effect precipitation of the 3-ethylene thioketal. After chilling at 0° for thirty minutes, the suspension is filtered and the filter cake is washed with cold methanol.

The desired 3-ethylene thioketal is thus obtained in a state of high purity in a yield of 95% of theory. The product, after recrystallization from acetone, melts at 269–272° C. with decomposition.

EXAMPLE XI

6α-Methyl-17α-Acetoxy Progesterone-3-Propylene Thioketal

The procedure described in Example IX above is repeated substituting for the 5 ml. of ethanedithiol an equivalent volume of 1,3-propanedithiol.

The desired 3-propylene dithioketal is obtained in a yield of 76% of theory. M.P. 250–257° C. with decomposition.

EXAMPLE XII

6α-Methyl-3-Bis Ethylthio-4-Pregnen-17α-Ol-20-One Acetate

The procedure described in Example X is repeated substituting for the 5 ml. of ethanedithiol, an equivalent volume of ethyl mercaptan. The desired 6α-methyl-3-bis ethylthio-4-pregnen-17α-ol-20-one acetate is obtained in a yield of 92% of theory.

EXAMPLE XIII

6α-Methyl-3-Ethylene Thioketal-4-Pregnen-17α-Ol-20-One Propionate

The procedure described in Example X is repeated substituting for the 5 grams of 6α-methyl-17α-acetoxy progesterone an equivalent weight of 6α-methyl progesterone-17α-ol propionate.

The desired 6α-methyl-3-ethylene thioketal 4-pregnen-17α-ol-20-one propionate is obtained in a yield of 87% of theory.

EXAMPLE XIV

6α-Methyl-3-Ethylene Thioketal-4-Pregnen-17α-Ol-20-One n-Valerate

The procedure described in Example X is repeated substituting for the 5 grams of 6α-methyl-17α-acetoxy progesterone an equivalent weight of 6α-methyl progesterone-17α-ol n-valerate.

The desired 6α-methyl-3-ethylene thioketal 4-pregnen-17α-ol-20-one n-valerate is obtained in a yield of 80% of theory.

EXAMPLE XV

6α-Methyl-3-Ethylene Thioketal-4-Pregnen-17α-Ol-20-One Cyclopentylpropionate The procedure described in Example X is repeated substituting for the 5 grams of 6α-methyl-17α-acetoxy progesterone an equivalent weight of 6α-methyl progesterone-17α-ol cyclopentylpropionate.

The desired 6α-methyl-3-ethylene thioketal 4-pregnen-17α-ol-20-one cyclopentylpropionate is obtained in a yield of 83% of theory.

EXAMPLE XVI

6α-Methyl-3-Ethylene Thioketal-4-Pregnen-17α-Ol-20-One n-Butyrate

The procedure described in Example X is repeated substituting for the 5 grams of 6α-methyl-17α-acetoxy progesterone an equivalent weight of 6α-methyl progesterone-17α-ol n-butyrate.

The desired 6α-methyl-3-ethylene thioketal 4-pregnen-17α-ol-20-one n-butyrate is obtained in a yield of 76% of theory.

EXAMPLE XVII

6α-Methyl-3-Ethylene Thioketal-4-Pregnen-17α-Ol-20-One n-Hexanoate

The procedure described in Example X is repeated substituting for the 5 grams of 6α-methyl-17α-acetoxy progesterone an equivalent weight of 6α-methyl progesterone-17α-ol n-hexanoate.

The desired 6α-methyl-3-ethylene thioketal 4-pregnen-17α-ol-20-one n-hexanoate is obtained in a yield of 78% of theory.

EXAMPLE XVIII

6α-Methyl-3-Ethylene Thioketal-4-Pregnen-17α-Ol-20-One n-Octanoate

The procedure described in Example X is repeated substituting for the 5 grams of 6α-methyl-17α-acetoxy progesterone an equivalent weight of 6α-methyl progesterone-17α-ol n-octanoate.

The desired 6α-methyl-3-ethylene thioketal 4-pregnen-17α-ol-20-one n-octanoate is obtained in a yield of 85% of theory.

EXAMPLE XIX

6α-Methyl-3-Ethylene Thioketal-4-Pregnen-17α-Ol-20-One n-Heptanoate

The procedure described in Example X is repeated substituting for the 5 grams of 6α-methyl-17α-acetoxy progesterone an equivalent weight of 6α-methyl progesterone-17α-ol n-heptanoate.

The desired 6α-methyl-3-ethylene thioketal 4-pregnen-

17α-ol-20-one n-heptanoate is obtained in a yield of 67% of theory.

In the literature pertaining to inhibition of ovulation the term "ovulation inhibition" is frequently applied to a wide time-span and physiological actions that may include the inhibition of follicular development through prolonged administration of inhibiting agents that generally act through inhibition of total ovarian activity, such as the natural hormones, estrogens, androgens, progestins.

The compounds of the present invention seem to effect an immediate ovulation stop, upon the short term or single administration of these compounds prior to expected ovulation.

It is to be understood that the invention is not to be limited to the exact details of operation or exact compounds shown and described as obvious modifications and equivalents will be apparent to one skilled in the art, and the invention is therefore to be limited only by the scope of the appended claims.

This application is a continuation-in-part of my copending application, Serial No. 125,995, filed July 24, 1961.

What is claimed is:

1. 6α-methyl-4-pregnen-17α-ol-20-one-3-ethylene thioketal.
2. 6α-methyl-17α-acetoxy progesterone-3-ethylene thioketal.
3. 6α-methyl-17α-acetoxy progesterone-3-propylene thioketal.
4. 6α-methyl-3-bis-ethylthio-4-pregnen-17α-ol-20-one acetate.
5. 6α-methyl-3-ethylene thioketal-4-pregnen-17α-ol-20-one propionate.
6. 6α-methyl-3-ethylene thioketal-4-pregnen-17α-ol-20-one n-valerate.
7. 6α-methyl-3-ethylene thioketal-4-pregnen-17α-ol-20-one n-octanoate.
8. 6α-methyl-3-ethylene thioketal-4-pregnen-17α-ol-20-one n-heptanoate.
9. 6α-methyl-3-ethylene thioketal-4-pregnen-17α-ol-20-one n-hexanoate.
10. 6α-methyl-3-ethylene thioketal-4-pregnen-17α-ol-20-one n-butyrate.
11. 6α-methyl-3-ethylene thioketal-4-pregnen-17α-ol-20-one cyclopentylpropionate.
12. A compound having the structure

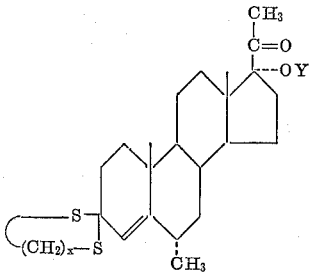

in which $x$ is an integer larger than one and smaller than four, and Y is a radical selected from the group consisting of hydrogen and alkanoyl radicals.

References Cited in the file of this patent
UNITED STATES PATENTS
2,744,110    Ralls et al. _____ May 1, 1956

OTHER REFERENCES
Babcock et al.: J.A.C.S., vol. 80, 1958, pp. 2905 and 2906.